United States Patent
Singh et al.

(10) Patent No.: US 9,426,828 B1
(45) Date of Patent: Aug. 23, 2016

(54) VARIATION OF RACH PREAMBLE GROUPING

(71) Applicant: Sprint Spectrum L.P., Overland Park, KS (US)

(72) Inventors: Jasinder P. Singh, Olathe, KS (US); Siddharth S. Oroskar, Overland Park, KS (US); Maulik K. Shah, Austin, TX (US)

(73) Assignee: Sprint Spectrum L.P., Overland Park, KS (US)

( * ) Notice: Subject to any disclaimer, the term of this patent is extended or adjusted under 35 U.S.C. 154(b) by 55 days.

(21) Appl. No.: 14/303,097

(22) Filed: Jun. 12, 2014

(51) Int. Cl.
| | |
|---|---|
| *H04W 72/08* | (2009.01) |
| *H04W 74/08* | (2009.01) |
| *H04W 72/04* | (2009.01) |
| *H04W 72/02* | (2009.01) |
| *H04W 74/00* | (2009.01) |

(52) U.S. Cl.
CPC .......... *H04W 74/0833* (2013.01); *H04W 72/08* (2013.01); *H04W 72/082* (2013.01); *H04W 72/02* (2013.01); *H04W 72/04* (2013.01); *H04W 74/006* (2013.01); *H04W 74/0866* (2013.01)

(58) Field of Classification Search
CPC . H04W 72/08; H04W 72/082; H04W 74/006; H04W 72/00; H04W 74/0866; H04W 72/02; H04W 72/04; H04W 72/006; H04W 84/18; H04W 74/008
See application file for complete search history.

(56) References Cited

U.S. PATENT DOCUMENTS

| | | |
|---|---|---|
| 2009/0042582 A1 | 2/2009 | Wang et al. |
| 2012/0033613 A1* | 2/2012 | Lin ...................... H04W 74/085 370/328 |
| 2012/0077507 A1 | 3/2012 | Lee |

OTHER PUBLICATIONS

Basir, Adnan, 3GPP Long Term Evolution (LTE): Random Access Procedure in LTE, available at http://4g-lte-world.blogspot.com/2013/04/random-access-procedure-rach-in-lte.html, 8 pages, Apr. 29, 2013.
RACH, ShareTechnote, available at http://www.sharetechnote.com/html/RACH_LTE.html, 48 pages, downloaded Jun. 12, 2014.
Tayal, Nitin, Random Access Procedure (RACH) | Tayal's way to learn LTE, available at http://nitintayal-lte-tutorials.blogspot.com/2013/09/random-access-procedure-rach.html, 16 pages, Sep. 19, 2013.

* cited by examiner

*Primary Examiner* — Faruk Hamza
*Assistant Examiner* — Aixa Guadalupe-Cruz

(57) ABSTRACT

A base station may provide wireless service on an air interface that defines different mutually exclusive groups of random access channel (RACH) instances for different uses. In one example, the air interface may define a first group of RACH instances having groupings of preambles for designating a value of a characteristic, and define a second group of RACH instances that does not have groupings of preambles. As another example, the air interface may define a first group of RACH instances that has groupings of preambles for designating a value of a first characteristic, and define a second group of RACH instances that has groupings of preambles for designating a value of a second characteristic. The base station may then differentially handle random access requests based on whether the base station receives a preamble in a RACH instance of the first group or rather the second group.

17 Claims, 6 Drawing Sheets

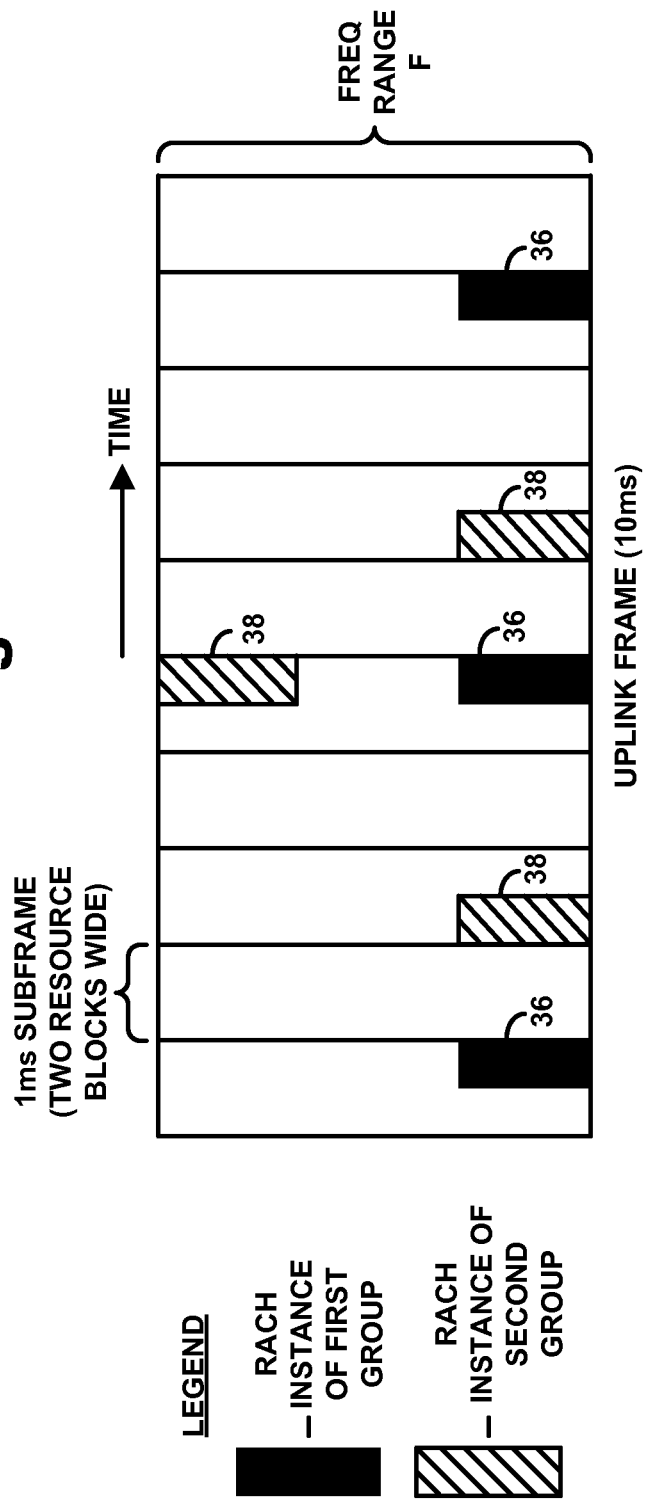

SYSTEM INFORMATION MESSAGE

. . .

FIRST GROUP OF RACH INSTANCES

SYSTEM FRAME NUMBER:   ANY

SUBFRAME NUMBERS:   1, 4, 7

CHARACTERISTIC:   SERVICE PRIORITY

PREAMBLE GROUP A:   PREAMBLES 1-5
CHARACTERISTIC VALUE:   1

PREAMBLE GROUP B:   PREAMBLES 6-10
CHARACTERISTIC VALUE:   2

PREAMBLE GROUP C:   PREAMBLES 11-20
CHARACTERISTIC VALUE:   3

SECOND GROUP OF RACH INSTANCES

SYSTEM FRAME NUMBER:   ANY

SUBFRAME NUMBERS:   2, 5, 8

CHARACTERISTIC:   MESSAGE SIZE

PREAMBLE GROUP A:   PREAMBLES 1-10
CHARACTERISTIC VALUE:   < THRESHOLD

PREAMBLE GROUP B:   PREAMBLES 11-20
CHARACTERISTIC VALUE:   >= THRESHOLD

VARIATION OF RACH PREAMBLE GROUPING

BACKGROUND

Unless otherwise indicated herein, the materials described in this section are not prior art to the claims and are not admitted to be prior art by inclusion in this section.

A typical cellular wireless network includes a number of base stations each radiating to define a respective coverage area in which mobile terminals such as cell phones, tablet computers, tracking devices, embedded wireless modules, and other wirelessly equipped communication devices, can operate. In turn, each base station may be coupled with network infrastructure that provides connectivity with one or more transport networks, such as the public switched telephone network (PSTN) and/or the Internet for instance. With this arrangement, a mobile terminal within coverage of the network may engage in air interface communication with a base station and may thereby communicate via the base station with various remote network entities or with other mobile terminals served by the base station.

Further, a cellular wireless network may operate in accordance with a particular air interface protocol or "radio access technology," with communications from the base stations to mobile terminals defining a downlink or forward link and communications from the mobile terminals to the base stations defining an uplink or reverse link. Examples of existing air interface protocols include, without limitation, Orthogonal Frequency Division Multiple Access (OFDMA (e.g., Long Term Evolution (LTE)), Code Division Multiple Access (CDMA) (e.g., 1×RTT and 1×EV-DO), Wireless Interoperability for Microwave Access (WiMAX), and Global System for Mobile Communications (GSM), among others. Each protocol may define its own procedures for registration of mobile terminals, initiation of communications, handover between coverage areas, and other functions related to air interface communication.

In accordance with the air interface protocol, each coverage area may operate on one or more carrier frequencies or range of carrier frequencies. Further, each coverage area may define a number of channels or specific resources for carrying signals and information between the base station and mobile terminals. For instance, certain resources on the downlink may be reserved to carry a pilot or reference signal that mobile terminals may detect as an indication of coverage and may measure to evaluate coverage quality. Further, certain resources on the uplink may be reserved to carry access requests from mobile terminals seeking to gain access to the base station. And certain resources on the downlink may be reserved to carry control messaging such as paging messages and random access response messages from the base station. In addition, certain resources on the uplink and downlink may be set aside to carry bearer traffic (e.g., user communications) in a manner assigned or scheduled by the station for instance.

When a mobile terminal is within coverage of a base station, the mobile terminal may from time to time transmit to the base station an access request message. The purpose of such an access request message may depend on the air interface protocol and the circumstances. By way of example, a mobile terminal may transmit an access request as a request to gain initial access to communication with a base station, such as to transition from an idle state to a connected state for instance or to facilitate handover to the base station. As another example, a mobile terminal may transmit an access request as a response to a page message and/or as a request to establish a particular communication connection such as a call or data session. As still another example, a mobile terminal may transmit an access request to register or reregister with a base station and/or to provide a location or tracking area update. And as still another example, a mobile terminal may transmit an access request to provide the base station with timing advance information or the like, to facilitate positioning. Once the base station receives a mobile terminal's access request, perhaps after further processing by the base station and/or associated infrastructure, the base station may then transmit an access response message to the mobile terminal.

By way of example, the initial access request that a mobile terminal transmits to the base station may take the form of a signature or pattern that is randomly selected from a plurality of signatures. For instance, in an LTE system, 64 signatures, referred to as preambles, are available, and the mobile terminal may randomly select one of the preambles to transmit to the base station. Since multiple mobile terminals may be transmitting access requests at the same time, the preamble may serve to differentiate the request transmitted by the mobile terminal from other requests originating from different mobile terminals. Once the base station receives the preamble, the base station may transmit an access response message corresponding to the received preamble. For instance, the response message may include an assignment of an initial uplink resource for the mobile terminal to use to communicate with the base station. In response to detecting the access response message corresponding to the preamble, the mobile terminal may then communicate with the base station on the assigned uplink resource to complete the communication connection.

OVERVIEW

In practice, when a mobile terminal transmits an access request to a base station, the mobile terminal does not have a specific resource that is allocated to the mobile terminal for use to transmit the access request. Rather, the mobile terminal transmits the access request over a shared resource that is simultaneously shared with other mobile terminals. As discussed above, when seeking access to a base station, the mobile terminal may transmit a randomly selected preamble, or other signature, over the shared resource. And the selected preamble may serve to differentiate the request transmitted by the mobile terminal from other requests transmitted by other mobile terminals. However, when a mobile terminal first transmits a preamble to the base station, it may be difficult for the base station to determine characteristics of the mobile terminal or characteristics of the access request, since the transmitted preamble is randomly selected and is the only information that is initially transmitted to the base station by the mobile terminal.

Further, in existing wireless communication systems, a situation can arise where two or more mobile terminals transmit the same preamble to a base station at the same time. This situation is referred to as contention. When contention occurs, perhaps only one of the mobile terminals, if any, will be able to connect to the base station at that time, and each other mobile terminal will be unable to successfully connect to the base station. After expiration of a predetermined timer, the other mobile terminals may re-request access to the base station by reselecting a preamble and transmitting the preamble to the base station. Consequently, contention may therefore introduce undesired delay into the access request process.

One way to allow a mobile terminal to provide more information to a base station when seeking access to the base station is to divide the available preambles into two or more mutually exclusive groups that each correspond with a respective value of a characteristic. For example, the characteristic may be indicative of a size of a message to be transmitted by the mobile terminal, a service priority of a mobile terminal's request, an interface channel condition (e.g., path loss) perceived by the mobile terminal, or a device type of the mobile terminal. A mobile terminal can then designate a value of the characteristic by selecting and using a preamble from the appropriate group. And when the base station receives the preamble, the base station can readily determine the value of the characteristic based on which group the preamble belongs to, and act accordingly.

As a particular example, the preambles may be divided into a first group of preambles and a second group of preambles each corresponding respectively to a different size (or size range) of a message to be transmitted to the base station. Depending on a size of a message to be transmitted by a mobile terminal, the mobile terminal may thus decide whether to randomly select a preamble from either the first group or instead the second group. For instance, if a size of a potential message to be transmitted by the mobile station is greater than a message size threshold, the mobile terminal may select a preamble from the first group. On the other hand, if the size of the potential message to be transmitted is less than the message size threshold, the mobile terminal may select a preamble from the second group. In this scenario, the particular preamble transmitted by the mobile terminal to the base station may identify to the base station whether the mobile terminal intends to transmit a message that is greater than or less than the message size threshold. And the base station may allocate an appropriate amount or type of resources for use by the mobile terminal, depending on the message size.

Similarly, in other examples, the available preambles may be divided into mutually exclusive groups that are indicative of other characteristics. For instance, the preambles may be divided into two or more groups that are indicative of a service priority of a mobile terminal's request. Depending on the service priority of the mobile terminal's request, the mobile terminal may select a preamble from a first group or instead a second group, and transmit the selected preamble to the base station. The base station may then determine the service priority of the mobile terminal's request, based on whether the received preamble belongs to the first group or rather the second group, and act accordingly to prioritize the mobile terminal's request.

Unfortunately, however, partitioning preambles into groups in this manner increases the probability of contention, since two mobile terminals that share the same value of a characteristic and are seeking access at the same time would have fewer preambles to randomly select from as compared to a situation where the preambles are not partitioned. Further, partitioning the preambles into groups that each correspond to a respective value of a characteristic may unduly harm mobile terminals that do not need or desire to designate a value of the characteristic when seeking access to a base station. For example, situations may arise where a characteristic is not applicable to a group of mobile terminals, such that the mobile terminals have no reason to designate a value of the characteristic, or where a mobile terminal does not need to designate a value of the characteristic. In these situations, partitioning the preambles into groups may increase the likelihood of contention for the group of mobile terminals, without providing any benefit to the mobile terminals.

In addition, if the preambles are partitioned into more than two groups, this may further increase the probability of contention, since the number of preambles available for selection within each group may decrease if new groups are added. While it may be beneficial to allow mobile terminals to more precisely define a characteristic by selecting a preamble from, for example, four different groups that each correspond to a respective value of the characteristic rather than only two groups, partitioning the available preambles into a greater number of groups may also introduce the risk of over-reserving too many preambles for a particular group. For instance, reserving preambles in a particular group that is seldom used may limit the number of preambles available in a more frequently used group.

Moreover, it is difficult to allow mobile terminals to designate values of multiple different characteristics without increasing the likelihood of contention. For example, in order to simultaneously allow some mobile terminals to designate a value of a first characteristic and other mobile terminals to instead designate a value of a second characteristic, the available preambles must be partitioned into at least two groups that each correspond to a respective value of the first characteristic as well as two groups that each correspond to a respective value of the second characteristic. Consequently, an improvement is desired.

Disclosed herein are methods and corresponding systems to help address these problems. As discussed above, it may be beneficial to divide preambles into groups to allow a mobile terminal to designate a value of a characteristic. And it may also be desirable to allow a mobile terminal to decide which one of multiple different characteristics to designate. Further, it may even be appropriate to group preambles differently for the multiple different characteristics to allow a mobile terminal to precisely define a value of the selected characteristic. For instance, there may be two possible values (or ranges of values) of a first characteristic but five possible values (or ranges of values of a second characteristic), such that is desirable to define two groups corresponding to the first characteristic and five groups corresponding to the second characteristic. But on the other hand, it may also be beneficial to avoid grouping preambles so that mobile terminals can request access without designating a characteristic and with the benefit of less likelihood of contention. In accordance with this disclosure, a base station may provide an air interface that defines different mutually exclusive groups of random access channel (RACH) instances for different uses.

The RACH instances at issue may be resources designated for carrying random access requests from mobile terminals to the base station, and can take any of a variety of forms, depending on the air interface protocol and various other factors. By way of example, in an LTE system, the RACH instances could be particular groups of physical resource blocks on which mobile terminals can transmit RACH access preambles.

As one example of groups of RACH instances that an air interface may define for different uses, the air interface may define a first group of RACH instances that may allow mobile terminals to select a preamble from multiple groupings of preambles to designate a value of a characteristic (meaning that the first group of RACH instances has multiple groupings of preambles), and define a second group of RACH instances that may allow all of the preambles to be used generally, without defining groupings of preambles. As another example, an air interface may define a first group of RACH instances that has different groupings of preambles for designating a value of a first characteristic, and define a second group of RACH instances that has multiple groupings of preambles for designating a value of a second characteristic that is different from the first characteristic.

In this manner, the base station may then differentially handle random access requests from mobile terminals based on whether the base station receives from a mobile terminal a preamble in a RACH instance of the first group of RACH instances or rather in a RACH instance of the second group of RACH instances. For instance, the base station may decide, based at least in part on whether the base station receives a preamble in a RACH instance of the first group or rather in a RACH instance of the second group, whether or not to determine a characteristic of the mobile terminal based on which preamble the received preamble is. Or in another instance, the base station may decide, based at least in part on whether the base station receives a preamble in a RACH instance of the first group or rather in a RACH instance of the second group, whether to determine a first characteristic or rather a second characteristic based on which preamble the received preamble is.

In one example implementation, the base station may provide wireless service on an air interface that defines a first group of RACH instances having multiple mutually exclusive groups of preambles each corresponding with a respective value of a characteristic (e.g., a service priority, a message size, an air interface channel condition, a device type, etc.). A mobile terminal that wishes to designate the characteristic can do so by selecting a preamble from the appropriate group and transmitting the preamble in a RACH instance of the first group. Meanwhile, the air interface may also define a second group of RACH instances. In the second group of RACH instances, the base station may allow all of the preambles to be used generally, without defining groupings of preambles. Accordingly, a mobile terminal that wishes to provide a preamble without designating the characteristic can thus, transmit the preamble in one of the RACH instances of the second group of RACH instances rather than in one of the RACH instances of the first group of RACH instances. Beneficially, sending the preamble in the RACH instance of the second group would have less risk of contention than sending the preamble in a RACH instance of the first group since there are more available preambles to select from in the second group of RACH instances.

In another example implementation, the base station may provide wireless service on an air interface that defines a first group of RACH instances having multiple mutually exclusive groups of preambles each corresponding with a respective value of a first characteristic, and defines a second group of RACH instances having multiple mutually exclusive groups of preambles each corresponding with a respective value of a second characteristic that is different from the first characteristic. With such an arrangement, the mobile terminal may decide to transmit a preamble in a RACH instance of the second group of RACH instances rather than in a RACH instance of the first group of RACH instances in order to designate a value of the second characteristic rather than a value of the first characteristic. And in response to receiving the preamble, the base station may, based at least in part on the base station receiving the preamble in a RACH instance of the second group of RACH instances rather than in a RACH instance of the first group of RACH instances, determine the second characteristic of the mobile terminal based on which preamble the received preamble is. Thus, the disclosed systems and methods may also provide for different groupings of preambles in different RACH instances.

Accordingly, disclosed herein is a base station that may include a processor and include an antenna structure for providing wireless service on an air interface. The air interface may define a plurality of periodically recurring RACH instances for carrying random access requests from mobile terminals to the base station. Further, the plurality of RACH instances may include a first group of RACH instances and a second group of RACH instances, the first group of RACH instances and the second group of RACH instances being mutually exclusive.

Additionally, the base station may differentially handle random access requests from the mobile terminals based on whether the base station receives from a mobile terminal a preamble in a RACH instance of the first group of RACH instances or rather in a RACH instance of the second group of RACH instances. Specifically, if the base station receives the preamble in a RACH instance of the first group of RACH instances, then, based at least in part on the RACH instance in which the base station received the preamble having been in the first group of RACH instances rather than in the second group of RACH instances, the base station may determine a characteristic of the mobile terminal based on which preamble the received preamble is. But if the base station receives the preamble in a RACH instance of the second group of RACH instances, then, based at least in part on the RACH instance in which the base station received the preamble having been in the second group of RACH instances rather than in the first group of RACH instances, the base station may not determine the characteristic of the mobile terminal based on which preamble the received preamble is.

In another respect, disclosed is a method that may involve providing, by a cellular base station, wireless service on an air interface. The air interface may define a plurality of periodically recurring RACH instances for carrying random access requests from mobile terminals to the base station. Further, the plurality of RACH instances may include a first group of RACH instances and a second group of RACH instances, the first group of RACH instances and the second group of RACH instances being mutually exclusive. The method may also involve receiving, by the cellular base station, a preamble transmitted from a given mobile terminal in a particular RACH instance of the first group of RACH instances or the second group of RACH instances. The method may then involve determining, by the cellular base station, whether the particular RACH instance is in the first group of RACH instances or rather is in the second group of RACH instances. Additionally, the method may involve, based on the determination of whether the particular RACH instance is in the first group of RACH instances or rather is in the second group of RACH instances, making, by the cellular base station, a decision of whether to determine a characteristic of the mobile terminal based at least in part on the received preamble. And if the cellular base station decides to determine the characteristic of the mobile terminal, the method may then involve the cellular base station determining the characteristic of the mobile terminal based on which preamble the received preamble is. But if the cellular base station decides not to determine the characteristic of the mobile terminal, the method may then involve the cellular base station not determining the characteristic of the mobile terminal based on which preamble the received preamble is.

Still further, in another respect, disclosed is a method that may involve detecting, by a mobile terminal, coverage of a base station. The base station may provide wireless service on an air interface defining a plurality of periodically recurring RACH instances for carrying random access requests from mobile terminals to the base station. Further, the plurality of RACH instances may include a first group of RACH instances and a second group of RACH instances, the first group of RACH instances and the second group of RACH instances being mutually exclusive. The method may also involve making, by the mobile terminal, a decision of whether to designate a characteristic of the mobile terminal when seeking access to the base station. If the decision is to designate the characteristic of the mobile terminal when seeking access to the base station, the method may then involve the mobile terminal selecting a preamble based at least in part on the characteristic of the mobile terminal and transmitting the selected preamble in a RACH instance of the first group of RACH instances rather than in a RACH instance of the second group of RACH instances. But if the decision is not to designate the characteristic of the mobile terminal, the method may then involve the mobile terminal transmitting any preamble in a RACH instance of the second group of RACH instances.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

BRIEF DESCRIPTION OF THE DRAWINGS

FIG. 3 is an illustration of example groups of RACH instances.

FIG. 4 is an illustration of an example system information message.

DETAILED DESCRIPTION

Figure 1:
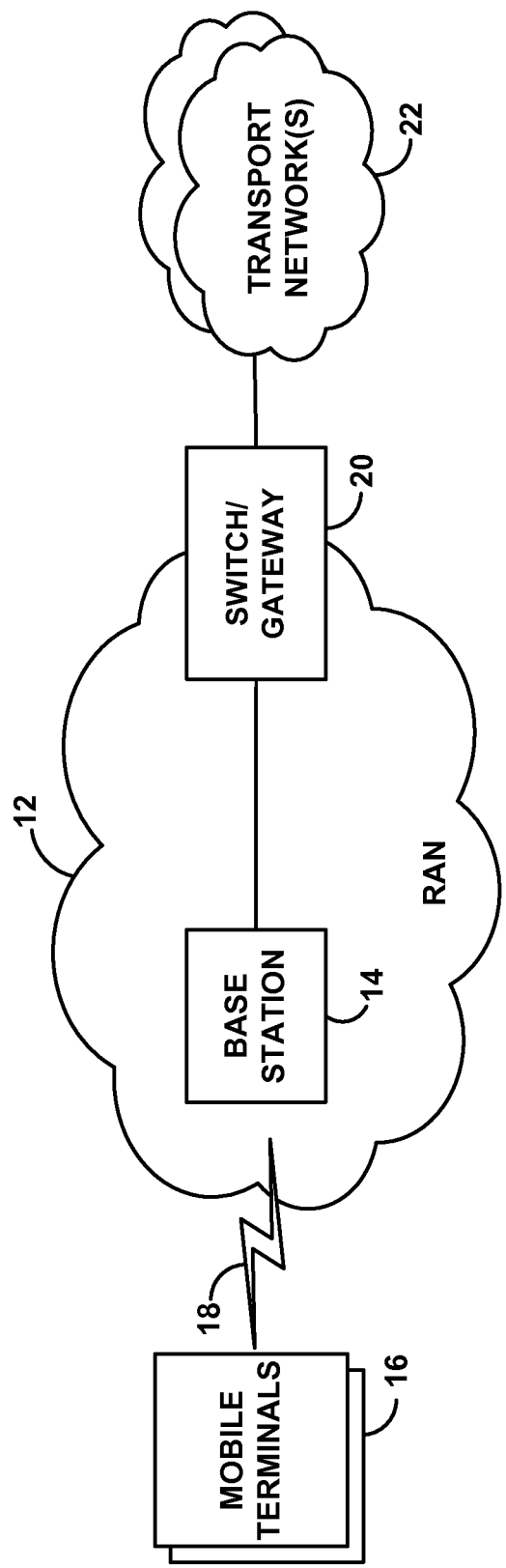
FIG. 1 is a simplified block diagram of an example wireless communication system in which the present disclosure can be implemented.

Referring to the drawings, as noted above, FIG. 1 is a simplified block diagram of an example wireless communication system in which the present disclosure can be implemented. It should be understood, however, that this and other arrangements described herein are set forth only as examples. As such, those skilled in the art will appreciate that other arrangements and elements (e.g., machines, interfaces, functions, orders, and grouping of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software.

FIG. 1 depicts the example communication system as including at its core a radio access network (RAN) 12 having a representative base station 14, base station 14 being arranged to serve mobile terminals 16 in a coverage area through an air interface 18. The base station may be a macro base station that is positioned at a fixed location and providing fairly wide coverage from that location. Alternatively, the base station may be a small cell base station that is currently located at a particular location and may provide more restricted coverage from that location.

RAN 12 further includes by way of example a switch or gateway 20 that provides connectivity with one or more transport networks 22, such as the PSTN or the Internet for instance. With this arrangement, each mobile terminal that is in coverage of the base station and that is suitably equipped may register or attach with the RAN and may engage in air interface communication with the base station so as to communicate in turn with various remote entities on the transport network(s) and/or with the other mobile terminals served by the RAN. Numerous variations from this arrangement are possible, however. For instance, the RAN may include more than one switch or gateway and may include various components between each switch or gateway and the transport network(s).

In this arrangement, the air interface 18 may be configured according to a particular air interface protocol, and the mobile terminal and base station may be programmed or otherwise configured to operate according to that protocol. As discussed above, examples of existing air interface protocols include, without limitation OFDMA, CDMA, and GSM, among others. According to the air interface protocol, air interface 18 may thus define a plurality of resource blocks for carrying communications between the mobile terminals and the base station.

Figure 2:
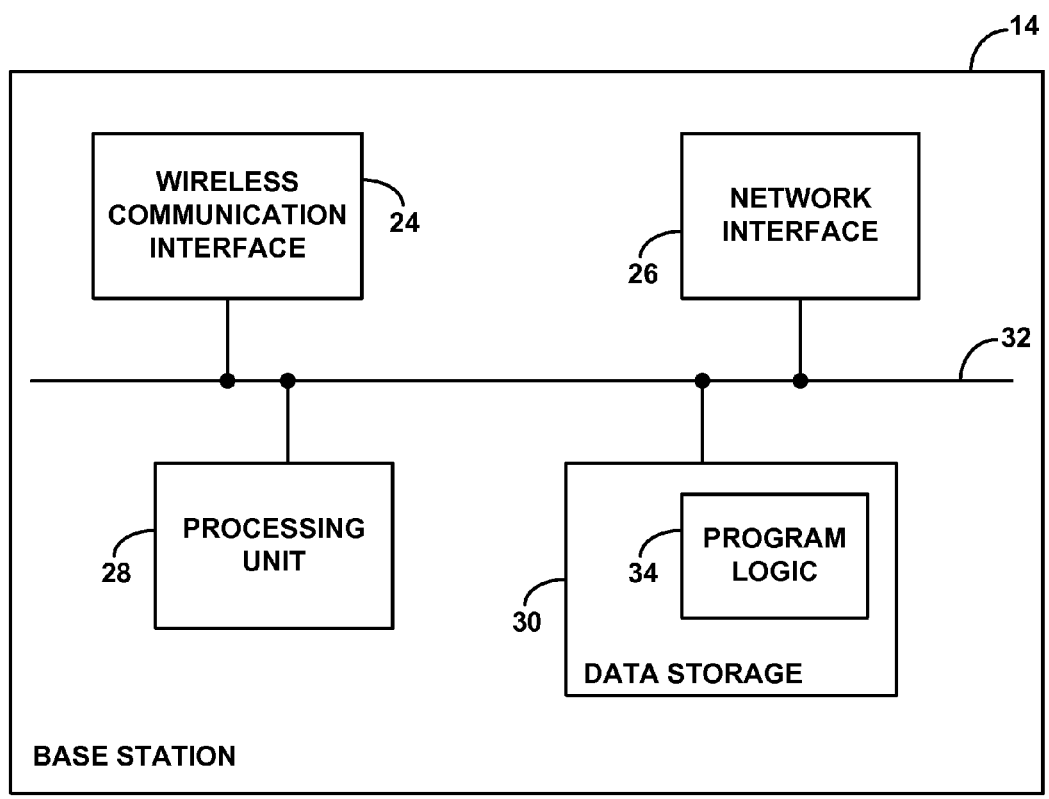
FIG. 2 is a simplified block diagram of an example base station, in accordance with exemplary embodiments.

FIG. 2 is next a simplified block diagram of a representative base station 14, such as a base transceiver station, access node, access point, Node-B, or eNodeB, for instance (whether macro, femto or the like), illustrating some of the components that can be included in such an entity. As shown in FIG. 2, the representative base station 14 includes a wireless communication interface 24, a network interface 26, a processing unit 28, and data storage 30, all of which may be coupled together by a system bus, network or other connection mechanism 32.

Wireless communication interface 24 may function to engage in air interface communication with served devices, such as mobile terminals 16. As such, wireless communication interface 24 may comprise an antenna arrangement (not shown), which may be tower mounted, and associated components such as a power amplifier and a cell site modem (not shown), so as to transmit and receive bearer and control data. Network interface 26 may then comprise a wired or wireless interface for communicating with the switch/gateway 20 for instance.

Processing unit 28 may then comprise one or more general purpose processers (e.g., microprocessors) and/or one or more special-purpose processors (e.g., digital signal processors and/or application specific integrated circuits) and may be integrated in whole or in part with the wireless communication interface 24. And data storage 30 may comprise one or more volatile and/or non-volatile storage components, such as magnetic, optical, flash, or other types of non-transitory computer readable media, and may be integrated in whole or in part with processing unit 28.

As shown, data storage 30 may store program logic 34 (e.g., machine language instructions), which may be executable by processing unit 28 to carry out various base station functions described herein. For instance, program logic 30 may be executable to cause the base station to provide wireless service on air interface that defines multiple mutually exclusive groups of RACH instances for different uses. Further, program logic 30 may be executable to cause the base station to differentially handle random access requests from mobile terminals, and to perform any of the various other base station functions discussed herein.

As discussed above, the RACH instances at issue in the present disclosure can take any of a variety of forms, depending on the air interface protocol and various other factors.

By way of example, in a CDMA system, each of various base station coverage areas includes one or more time-slotted access channels on which mobile terminals can transmit access probes defining access requests. In that scenario, the RACH instances could be particular ones of the access channels and/or particular timeslots on one or more such access channels.

In an LTE system, on the other hand, each of various base station coverage areas defines a continuum of periodically recurring frames (e.g., each 10 milliseconds long), each divided into a number of subframes (e.g., each 1 millisecond long) having two slots (e.g., each 0.5 milliseconds long), and each slot then defines a sequence of physical resource blocks (e.g., each 180 kHz wide) cooperatively spanning the base station's channel bandwidth. In that scenario, RACH instances could be particular groups of physical resource blocks, such as designated groups of six physical resource blocks each, on which mobile terminals can transmit RACH access preambles. Thus, a given LTE RACH instance could be defined as being a particular group of six resource blocks in a particular subframe, and that RACH instance may recur every 10 milliseconds.

As noted above, variations on the arrangement shown are possible. To help illustrate features of the present disclosure, the remainder of this document will focus on an LTE system by way of example. Those of ordinary skill in the art will readily appreciate, however, that the disclosed principles can be applied as well in other types of wireless communication systems, with variations where appropriate. For instance, in a CDMA system, a base station may be configured to differentially handle access probes from the mobile terminals based on the particular access channel and/or particular timeslot on an access channel on which the access probe is received.

In practice, the base station in the wireless communication system described above may designate certain RACH instances for use by mobile terminals seeking to access the base station. For instance, the base station may broadcast in its coverage area a system information message that designates the RACH instances that are available for use to carry access requests from mobile terminals. In particular, in LTE, this system information message may be a system information block (SIB) such as SIB2 for instance. A mobile terminal in coverage of the base station may thus read that system information message to determine what RACH instances are defined for use to transmit access requests to the base station, and the mobile terminal may then transmit an access request to the base station on one such RACH instance.

In accordance with the present disclosure, as discussed above, the base station may provide wireless service on an air interface that defines different mutually exclusive groups of RACH instances for different uses. For example, the air interface may define a first group of RACH instances that has multiple groupings of preambles for designating a value of a characteristic, and define a second group of RACH instances that may allow all of the preambles to be used generally, without defining groupings of preambles. In another example, an air interface may define a first group of RACH instances that has different groupings of preambles for designating a value of a first characteristic, and define a second group of RACH instances that has multiple groupings of preambles for designating a value of a second characteristic that is different from the first characteristic.

The system information message that designates the RACH instances that are available for use to carry access requests from mobile terminals may further specify which RACH instances belong to the first group and which RACH instances belong to the second group. As discussed above, the first and second group of RACH instances may be mutually exclusive. For instance, the base station may define periodically recurring frames each having a plurality of subframes.

Further, the base station may then designate a plurality of RACH instances on different resources within each frame. Each of the plurality of RACH instance may be distinguished from each other by one or more characteristics, such as time, frequency, and/or orthogonal coding.

For instance, the base station may designate six RACH instances per frame. Of the six RACH instances per frame, three RACH instances may be designated as being RACH instances of the first group of RACH instances and three other RACH instances may be designated as being RACH instances of the second group of RACH instances. In some examples, the RACH instances of the first group of RACH instances may be defined in one or more particular subframes of the frame, while the RACH instances of the second group of RACH instances may be defined in one or more subframes that are different from the particular subframes where the RACH instances of the first group of RACH instances are defined. Alternatively or additionally, one or more subframes may include both a RACH instance of the first group of RACH instances and a RACH instance of the second group of RACH instances. In this scenario, the RACH instance of the first group and the RACH instance of the second group may be defined on different resources of the one or more subframes. By way of example, a RACH instance of the first group may be defined on a first set of physical resource blocks of a subframe and a RACH instance of the second group may be defined on a second set of physical resource blocks of the subframe that is different from the first set of physical resource blocks.

FIG. 3 is an illustration of how these RACH instances may be arranged in a representative LTE implementation by way of example. In particular, the figure depicts a representation of a 10-millisecond uplink frame. As shown, the uplink frame includes ten 1 millisecond subframes divided into two timeslots that define resource blocks spanning a channel bandwidth (with only a portion of the bandwidth being show for simplicity). The arrangement shown is intentionally simplified for ease of illustration.

In the example arrangement of FIG. 3, the air interface provided by the base station defines three RACH instances 36 belonging to a first group of RACH instances, and defines three RACH instances 38 belonging to a second group of RACH instances. This arrangement illustrates two examples of how the RACH instances can be provided. As shown, in one example, at least one of the RACH instances of the first group of RACH instances could be provided in the same subframe where a RACH instance of the second group of RACH instances is provided. The RACH instance of the first group would just be defined as residing on a mutually exclusive set of resource blocks, separate from those defining the RACH instance of the second group in that subframe. And in other example, at least one of the RACH instances of the first group could be provided in a subframe in which a RACH instance of the second group is not defined.

In this arrangement, as discussed above, the base station may differentially handle random access requests from mobile terminals based on whether the base station receives from a mobile terminal a preamble in a RACH instance of the first group of RACH instances or rather in a RACH instance of the second group of RACH instances. For instance, the base station may decide, based at least in part on whether the base station receives a preamble in a RACH instance of the first group or rather in a RACH instance of the second group, whether or not to determine a characteristic of the mobile terminal based on which preamble the received preamble is. Or in another instance, the base station may decide, based at least in part on whether the base station receives a preamble in a RACH instance of the first group or rather in a RACH instance of the second group, whether to determine a first characteristic or rather a second characteristic based on which preamble the received preamble is.

By way of example, the base station may provide wireless service on an air interface that defines a first group of RACH instances that has multiple mutually exclusive groups of preambles each corresponding with a respective value of a characteristic, so that a mobile terminal that wishes to designate the characteristic can do so by selecting a preamble from the appropriate group and transmitting the preamble in a RACH instance of the first group. Meanwhile, the air interface may also define a second group of RACH instances. In the second group of RACH instances, the base station may allow all of the preambles to be used generally, without defining groupings of preambles, so that a mobile terminal that wishes to provide a preamble without designating the characteristic can thus, transmit the preamble in one of the RACH instances of the second group of RACH instances rather than in one of the RACH instances of the first group of RACH instances.

As noted above, the groups of preambles may correspond to a variety of types of characteristics associated with the mobile terminal. For instance, example characteristics include a mobile terminal's service priority, a size of message to be transmitted by the mobile terminal, an air interface condition perceived by the mobile terminal, or a device type of the mobile terminal, among other possible characteristics.

In practice, the base station may provide a system information message that specifies the groupings of preambles for the first group of RACH instances. Specifically, the base station may broadcast a system information message that specifies a correlation between each group of the group of preambles and the respective value of the characteristic. As an example, a system information message may specify that a first group of preambles corresponds to a first value (or range of values) of a characteristic and that a second group of preambles corresponds to a second value (or range of values) of the characteristic. In this situation, a mobile terminal may determine a value of the characteristic, and depending on the value, the mobile terminal may decide whether to select a random preamble from the first group or instead the second group. And if the mobile transmits a preamble to the base station in a RACH instance of the first group of RACH instances, the particular preamble that the mobile terminal transmits may identify the value of the characteristic to the base station based on which group of the multiple groups of preambles includes the received preamble.

This example configuration of RACH instances carefully balances the desire to provide an ample number of groupings of preambles such that a mobile terminal can precisely designate a value of a characteristic with the competing desire to avoid unnecessarily increasing the likelihood of contention for mobile terminals that do not wish to designate the characteristic. As discussed above, dividing preambles into groups may increase the likelihood of contention for mobile terminals that do not need to designate a value of the characteristic when seeking access to a base station. Advantageously, this example configuration provides a group of RACH instances that does not have groupings of preambles (i.e., the second group of RACH instances), such that mobile terminals can request access with less likelihood of contention by transmitting a preamble in a RACH instance of the group of RACH instances.

Further in line with the discussion above, in another example, the base station may provide different groups of RACH instances that allow mobile terminals to decide whether to designate a value of a first characteristic or to instead designate a value of a second characteristic. For instance, the base station may provide wireless service on an air interface that defines a first group of RACH instances having mutually exclusive groups of preambles each corresponding with a respective value of first characteristic, and defines a second group of RACH instances that has multiple mutually exclusive groups of preambles each corresponding with a respective value of a second characteristic that is different from the first characteristic. With such an arrangement, a mobile terminal may designate a value of the first characteristic by selecting a preamble and transmitting the preamble in a RACH instance of the first group or instead designate a value of the second characteristic by selecting a preamble and transmitting the preamble in a RACH instance of the second group.

In contrast to the previous situation in which the second group of RACH instances did not have groupings of preambles, in this situation, the second group of RACH instances may also have multiple groups of preambles. In particular, the second group of RACH instances may have multiple mutually exclusive groups of preambles that each correspond with a respective value of the second characteristic. Accordingly, to designate a value of the second characteristic, the mobile terminal may decide which group to select a random preamble from depending on the value of the characteristic. And if the mobile transmits the preamble in a RACH instance of the second group of RACH instances, the particular preamble that the mobile transmits may identify the value of the second characteristic to the base station based on which group of the multiple groups includes the received preamble.

This example configuration of RACH instances may be useful in a scenario where it is desirable to allow mobile terminals to designate values of multiple different characteristics. Advantageously, there may be less likelihood of contention in this example configuration of RACH instances when compared with another configuration in which a base station defines groups that correspond to both a first characteristic and a second characteristic within the same RACH instance, since the available preambles may be partitioned into a fewer number of groups per RACH instance in the example configuration.

Additionally, in this example configuration, the groupings of preambles of the second group of RACH instances may either be the same or different from the groupings of preambles of the first group of RACH instances. For instance, the first group of RACH instances may define a first number of groups of preambles, and the second group of RACH instances may either define the same number of groups of preambles or instead define a greater or lesser number of groups of preambles.

In some instances, the first group of RACH instances and the second group of RACH instances may each define the same number of groups of preambles; however, the distribution of preambles within the groups may be different between the first group of RACH instances and the second group of RACH instances. As an example, the first group of RACH instances and the second group of RACH instances may both have two groups of preambles. But the two groups of preambles of the first group of RACH instances may include twenty preambles and ten preambles respectively; while the two groups of preambles of the second group of RACH instances may both include fifteen preambles.

Just as the base station may provide a system information message that specifies the groupings of preambles for the first group of RACH instances, the base station may similarly specify the groupings of preambles for the second group of RACH instances within a system information message that is broadcast to mobile terminals. FIG. 4 is an illustration of an example system information message 40 that specifies groups of RACH instances and groups of preambles. In particular, the figure depicts system information message 40 as defining a first group of RACH instances and a second group of RACH instances. Further, the figure depicts system information message 40 as defining a first grouping of preambles for the first group of RACH instances and a second grouping of preambles for the second group of RACH instances. The illustration shown is intentionally simplified for ease of illustration.

As shown in FIG. 4, the first group of RACH instances is defined as resources in subframe numbers 1, 4, and 7 of any frame, while the second group of RACH instances is defined as resources in subframe numbers 2, 5, and 8 of any frame. As discussed above, in other examples, one or more RACH instances of the first group may be defined in a same subframe as a RACH instance of the second group (not shown).

Further, system information message 40 defines the first group of RACH instances as having three groups of preambles for designating a service priority. Specifically, preambles 1-5 correspond to a service priority of 1, preambles 6-10 correspond to a service priority of 2, and preambles 11-20 correspond to a service priority of 3. Meanwhile, system information message 40 also defines the second group of RACH instances as having two groups of preambles for designating a message size. Specifically, preambles 1-10 correspond to a message size that is less than a message size threshold, and preambles 11-20 correspond to a message size that is greater than the message size threshold.

In practice, a base station may broadcast system information message 40, which may also include additional information related to cell access, scheduling, and radio resource configuration, for example. Further, a mobile terminal in coverage of the base station may receive the system information message 40. In accordance with the example configuration defined by the system information message 40, a mobile terminal may then make a decision of whether to designate a value of service priority or message size when seeking access to the base station. If the decision is to designate a value of service priority, the mobile terminal may then determine a group corresponding to the mobile terminal's service priority, and randomly select a preamble from the group to transmit to the base station in a RACH instance of the first group of RACH instances. On the other hand, if the decision is to designate a value of message size, the mobile terminal may instead determine a group corresponding to a size of a message to be transmitted, and randomly select a preamble from the group to transmit to the base station in a RACH instance of the second group of RACH instances.

As a specific example, a mobile terminal may be seeking to engage in a Voice over Internet Protocol (VoIP) call, such that the mobile terminal's service priority is one. In order to ensure that the mobile terminal is given priority over other mobile terminals with lower service priority during times of high congestion, the mobile terminal may decide to designate the service priority value when seeking access to the base station, so that the base station can prioritize the mobile terminals request over other lower-priority requests. Accordingly, the mobile terminal may randomly select a preamble from group A (i.e. preambles 1-5) of the first group of RACH instances, and transmit the preamble in one of subframes 1, 4, or 7.

As another example, a mobile terminal may be seeking to transmit a particularly large message to the base station (e.g., a message that is larger than the message size threshold). Consequently, the mobile terminal may decide to designate a value of message size when seeking access to the base station, so that the base station can allocate an appropriate amount of resources for the communication. Accordingly, the mobile terminal may randomly select a preamble from group B (i.e. preambles 11-20) of the second group of RACH instances, and transmit the preamble in one of subframes 2, 5, or 8.

Further, the base station may then be configured to differentially handle random access requests received from mobile terminals, based at least in part on whether the base station receives a preamble from a mobile terminal in a RACH instance of the first group of RACH instances or rather in a RACH instance of the second group of RACH instances. In particular, upon receiving a preamble in a particular RACH instance, the base station may determine whether the particular RACH instance is in the first group of RACH instances or the second group of RACH instances. Based on the determination of whether the particular RACH instance is in the first group of RACH instances or rather is in the second group of RACH instances, the base station may make a decision of whether to determine a value of the first characteristic or instead the second characteristic based on which preamble the received preamble is.

As an example, the base station may receive preamble 3 from a mobile terminal on subframe 7. Because system information message 40 defines subframe 7 as a RACH instance of the first group of RACH instances, the base station may decide to determine a value of service priority based on which preamble the received preamble. In particular, the base station may determine, based on which group of preambles of the first group of RACH instances includes the received preamble. Because system information message 40 defines preamble 3 as being in group A, the base station may determine that service priority is the value of service priority corresponding to group A. In other words, the base station may determine that the value of service priority is one.

Similarly, when the base station receives a preamble from a mobile terminal in a RACH instance of the second group of RACH instances, the base station may decide to determine a value of message size because system information message 40 defines message size as the characteristic that a mobile terminal designates by transmitting a preamble in a RACH instance of the second group of RACH instances.

Figure 5:
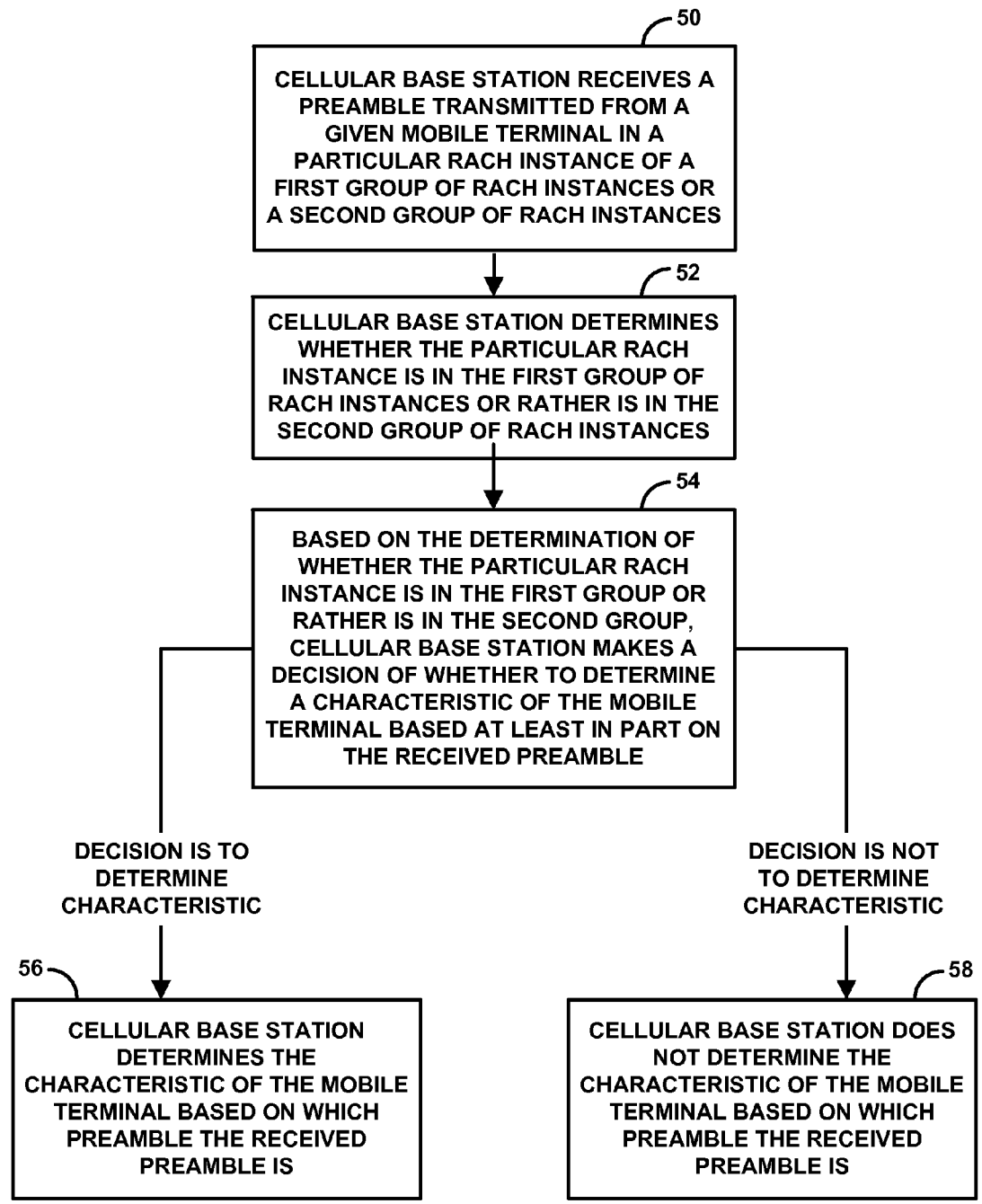
FIG. 5 is a flow chart depicting functions that can be carried out in accordance with the present disclosure.

FIG. 5 is next a flow chart depicting functions that can be carried out by a cellular base station (e.g., an eNodeB or other type of base station) in accordance with the present disclosure. In line with the discussion above, the base station may provide wireless service on an air interface defining a plurality of periodically recurring RACH instances for carrying random access requests from mobile terminals to the base station. Further, the plurality of RACH instances may include a first group of RACH instances and a second group of RACH instances, the first and second groups being mutually exclusive.

As shown in FIG. 5, at block 50, the cellular base station receives a preamble transmitted from a given mobile terminal in a particular RACH instance of the first group of RACH instances or the second group of RACH instances. At block 52, the cellular base station then determines whether the particular RACH instance is in the first group of RACH instances or rather is in the second group of RACH instances.

At block 54, based on the determination of whether the particular RACH instance is in the first group of RACH instances or rather is in the second group of RACH instances, the cellular base station makes a decision of whether to determine a characteristic of the mobile terminal based at least in part on the received preamble. For example, if the particular RACH instance is in the first group of RACH instances, the cellular base station may decide to determine the characteristic of the mobile terminal based at least in part on the received preamble. Whereas if the particular RACH instance is in the second group of RACH instances, then the cellular base station may instead decide not to determine the characteristic of the mobile terminal based at least in part on the received preamble.

And at blocks 56 and 58, the cellular base station then differentially handles the received preamble based on the decision of whether to determine the characteristic of the mobile terminal based at least in part on the received preamble. In particular, if decision is to determine the characteristic of the mobile terminal, then, at block 56 the cellular base station determines the characteristic of the mobile terminal based on which preamble the received preamble is. Whereas, if the decision is instead not to determine the characteristic of the mobile terminal, then, at block 58, the cellular base station does not determine the characteristic of the mobile terminal based on which preamble the received preamble is.

In line with the discussion above, the cellular base station may broadcast a system information message that specifies the first group of RACH instances and the second group of RACH instances. Further, the characteristic of the mobile terminal may be a service priority, a message size, an air interface channel condition, or a device type, for instance.

As noted above, the first group of RACH instances may have multiple groups of preambles, each group corresponding with a respective value of the characteristic. In this situation, the cellular base station may determine the characteristic of the mobile terminal based on which group of the multiple groups of preambles includes the received preamble.

Additionally, in some examples, based on the determination of whether the particular RACH instance is in the first group of RACH instances or rather is in the second group of RACH instances, the cellular base station may make another decision of whether to determine a second characteristic of the mobile terminal based at least in part on the received preamble. For instance, if the particular RACH instance is in the second group of RACH instances, then the cellular base station may decide to determine the second characteristic of the mobile terminal based at least in part on the received preamble. In this situation, the second group of RACH instances may have multiple groups of preambles, each group corresponding with a respective value of the second characteristic. And the cellular base station may then decide to determine the second characteristic of the mobile terminal based on which group of the multiple groups of preambles includes the received preamble.

Figure 6:
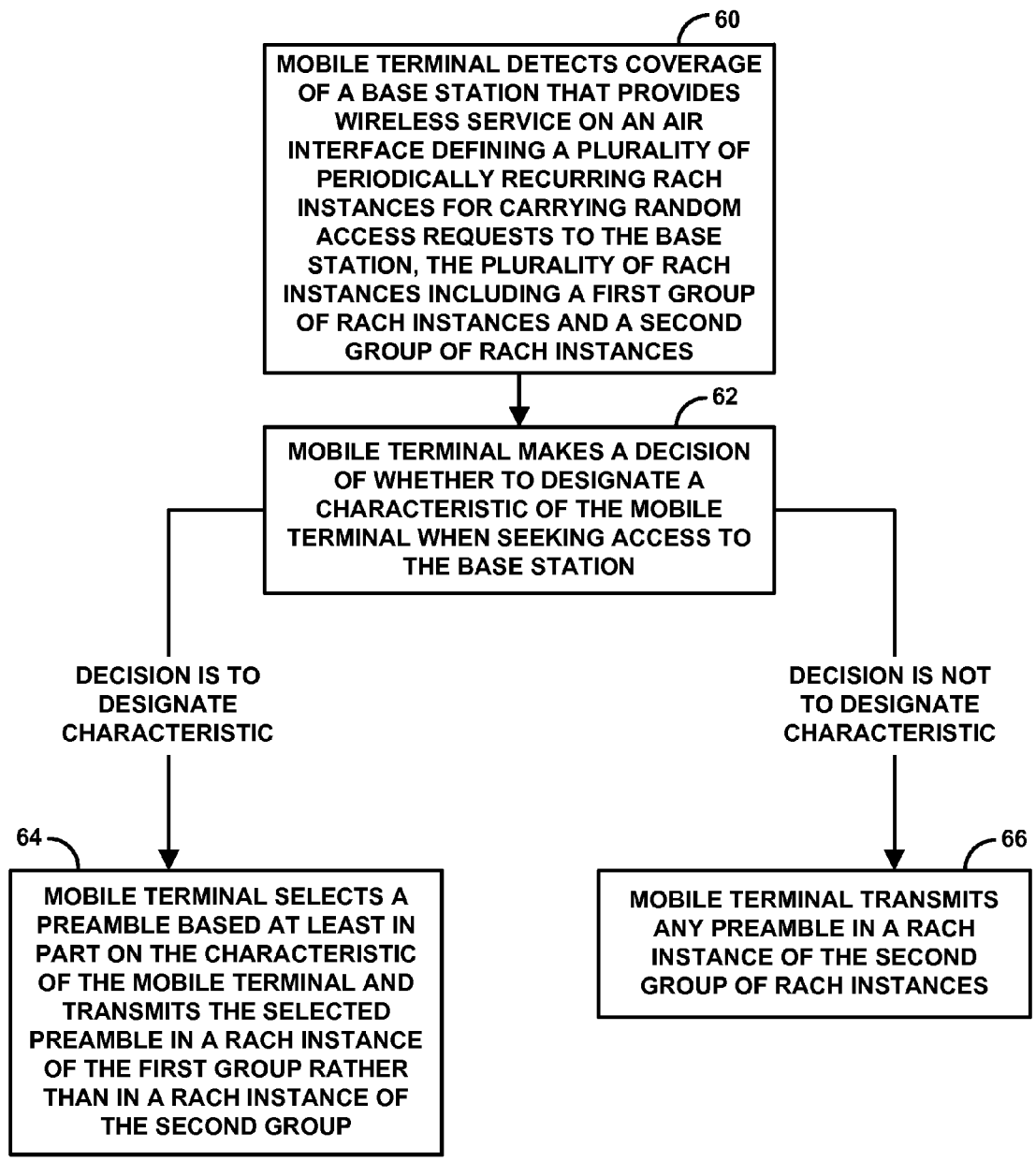
FIG. 6 is another flow chart depicting functions that can be carried out in accordance with the present disclosure.

FIG. 6 is a flow chart depicting functions that can be carried out by a mobile terminal in accordance with the present disclosure. As shown in FIG. 6, at block 60, a mobile terminal detects coverage of a base station that provides wireless service on an air interface defining a plurality of periodically recurring RACH instances for carrying random access requests from mobile terminals to the base station. The plurality of RACH instances include a first group of RACH instances and a second group of RACH instances, the first group of RACH instances and the second group of RACH instances being mutually exclusive. At block 62, the mobile terminal makes a decision of whether to designate a characteristic of the mobile terminal when seeking access to the base station.

If the decision is to designate the characteristic of the mobile terminal when seeking to access the base station, then, at block 64, the mobile terminal selects a preamble based at least in part on the characteristic of the mobile terminal and transmits the selected preamble in a RACH instance of the first group of RACH instances rather than in a RACH instance of the second group of RACH instances. But if the decision is not to designate the characteristic of the mobile terminal, then, at block 66, the mobile terminal transmits any preamble in a RACH instance of the second group of RACH instances.

In line with the discussion above, the first group of RACH instances may have multiple mutually exclusive groups of preambles, each group corresponding with a respective value of the characteristic. In this situation, selecting the preamble based at least in part on the characteristic of the mobile terminal may involve: the mobile terminal selecting, based on a value of the characteristic of the mobile terminal, one of the multiple groups of preambles; and the mobile terminal selecting the preamble from the preambles of the selected group of preambles.

Further in line with the discussion above, if the decision at block 62 is not to designate the characteristic of the mobile terminal, then at block 66, the mobile terminal may randomly select a preamble to be transmitted in the RACH instance of the second group of RACH instances. Or alternatively, at block 66, the mobile terminal may select a preamble to be transmitted in the RACH instance of the second group of RACH instances based at least in part on a second characteristic of the mobile terminal. For instance, the second group of RACH instances may have multiple mutually exclusive groups of preambles, each group corresponding with a respective value of the second characteristic. In particular, the mobile terminal may select, based on a value of the second characteristic of the mobile terminal, one of the multiple groups of preambles. And the mobile terminal may select the preamble to be transmitted to the base station from the preambles of the selected group of preambles.

Exemplary embodiments have been described above. It should be understood, however, that variations from these embodiments are possible, while remaining within the scope of the invention.

We claim:

1. A base station comprising:
a processor; and
an antenna structure for providing wireless service on an air interface, the air interface defining a plurality of periodically recurring random access channel (RACH) instances for carrying random access requests from mobile terminals to the base station, wherein the plurality of RACH instances includes a first group of RACH instances and a second group of RACH instances, the first group of RACH instances and the second group of RACH instances being mutually exclusive,
wherein the base station differentially handles random access requests from the mobile terminals based on whether the base station receives from a mobile terminal a preamble in a RACH instance of the first group of RACH instances or rather in a RACH instance of the second group of RACH instances, wherein: (i) if the base station receives the preamble in a RACH instance of the first group of RACH instances, then, based at least in part on the RACH instance in which the base station received the preamble having been in the first group of RACH instances rather than in the second group of RACH instances, the base station determines a characteristic of the mobile terminal based on which preamble the received preamble is, wherein the first group of RACH instances has multiple mutually exclusive groups of preambles, each group of the multiple groups corresponding with a respective value of the characteristic, and wherein determining the characteristic of the mobile terminal comprises determining a value of the characteristic based on which group of the multiple groups includes the received preamble; but (ii) if the base station receives the preamble in a RACH instance of the second group of RACH instances, then, based at least in part on the RACH instance in which the base station received the preamble having been in the second group of RACH instances rather than in the first group of RACH instances, the base station does not determine the characteristic of the mobile terminal based on which preamble the received preamble is.

2. The base station of claim 1, wherein if the base station receives the preamble in the RACH instance of the second group of RACH instances, then, based at least in part on the RACH instance in which the base station received the preamble having been in the second group of RACH instances rather than in the first group of RACH instances, the base station determines a second characteristic of the mobile terminal based on which preamble the received preamble is, the second characteristic being different from the first characteristic.

3. The base station of claim 1, wherein the base station broadcasts a system information message that specifies the first group of RACH instances and the second group of RACH instances and that designates the first group of RACH instances as being for use to designate the characteristic.

4. The base station of claim 3, wherein the system information message further specifies a correlation between each group of the multiple groups and the respective value of the characteristic.

5. The base station of claim 3, wherein the second group of RACH instances has multiple mutually exclusive groups of preambles that are different from the multiple groups of preambles of the first group of RACH instances, and wherein the system information message further designates the second group of RACH instances as being for use without designating the characteristic.

6. The base station of claim 5, wherein the multiple groups of preambles of the second group of RACH instances each correspond with a respective value of a second characteristic of the mobile terminal, and wherein if the base station receives the preamble in the RACH instance of the second group of RACH instances, then, based at least in part on the RACH instance in which the base station received the preamble having been in the second group of RACH instances rather than in the first group of RACH instances, the base station determines a value of the second characteristic of the mobile terminal based on which group of the multiple groups of the second group of RACH instances includes the received preamble.

7. The base station of claim 1, wherein the air interface defines periodically recurring frames each having a plurality of subframes, wherein the second group of RACH instances includes a second RACH instance defined in a same subframe as one of the RACH instances of the first group of RACH instances but on different resources of that same subframe.

8. The base station of claim 1, wherein the base station is a Long Term Evolution (LTE) evolved Node B (eNodeB).

9. The base station of claim 1, wherein the characteristic of the mobile terminal comprises a characteristic selected from the group consisting of: a service priority, a message size, an air interface channel condition, and a device type.

10. A method comprising:
providing, by a cellular base station, wireless service on an air interface, the air interface defining a plurality of periodically recurring random access channel (RACH) instances for carrying random access requests from mobile terminals to the base station, wherein the plurality of RACH instances includes a first group of RACH instances and a second group of RACH instances, the first group of RACH instances and the second group of RACH instances being mutually exclusive;

receiving, by the cellular base station, a preamble transmitted from a given mobile terminal in a particular RACH instance of the first group of RACH instances or the second group of RACH instances;

determining, by the cellular base station, whether the particular RACH instance is in the first group of RACH instances or rather is in the second group of RACH instances;

based on the determination of whether the particular RACH instance is in the first group of RACH instances or rather is in the second group of RACH instances, making, by the cellular base station, a decision of whether to determine a characteristic of the mobile terminal based at least in part on the received preamble; and if the cellular base station decides to determine the characteristic of the mobile terminal, then the cellular base station determining the characteristic of the mobile terminal based on which preamble the received preamble is, but if the cellular base station decides not to determine the characteristic of the mobile terminal, then the cellular base station not determining the characteristic of the mobile terminal based on which preamble the received preamble is, wherein the first group of RACH instances has multiple mutually exclusive groups of preambles, each group of the multiple groups corresponding with a respective value of the characteristic, and wherein determining the characteristic of the mobile terminal comprises determining a value of the characteristic based on which group of the multiple groups includes the received preamble.

11. The method of claim 10, wherein making the decision of whether to determine the characteristic of the mobile terminal based on the determination of whether the particular RACH instance is in the first group of RACH instances or rather is in the second group of RACH instances comprises (i) if the particular RACH instance is in the first group of RACH instances, then deciding to determine the characteristic of the mobile terminal based at least in part on the received preamble, but (ii) if the particular RACH instance is in the second group of RACH instances, then deciding not to determine the characteristic of the mobile terminal based at least in part on the received preamble.

12. The method of claim 10, further comprising, based on the determination of whether the particular RACH instance is in the first group of RACH instances or rather is in the second group of RACH instances, making, by the cellular base station, another decision of whether to determine a second characteristic of the mobile terminal based at least in part on the received preamble.

13. The method of claim 10, further comprising broadcasting a system information message that specifies the first group of RACH instances and the second group of RACH instances.

14. The method of claim 10, wherein the characteristic of the mobile terminal comprises a characteristic selected from the group consisting of: a service priority, a message size, an air interface channel condition, and a device type.

15. A method comprising:
detecting, by a mobile terminal, coverage of a base station, wherein the base station provides wireless service on an air interface, the air interface defining a plurality of periodically recurring random access channel (RACH)

instances for carrying random access requests from mobile terminals to the base station, wherein the plurality of RACH instances includes a first group of RACH instances and a second group of RACH instances, the first group of RACH instances and the second group of RACH instances being mutually exclusive, making, by the mobile terminal, a decision of whether to designate a characteristic of the mobile terminal when seeking access to the base station; and if the decision is to designate the characteristic of the mobile terminal when seeking access to the base station, then the mobile terminal selecting a preamble based at least in part on the characteristic of the mobile terminal and transmitting the selected preamble in a RACH instance of the first group of RACH instances rather than in a RACH instance of the second group of RACH instances, but if the decision is not to designate the characteristic of the mobile terminal, then the mobile terminal transmitting any preamble in a RACH instance of the second group of RACH instances, wherein the first group of RACH instances has multiple mutually exclusive groups of preambles, each group of the multiple groups corresponding with a respective value of the characteristic, and wherein selecting the preamble based at least in part on the characteristic of the mobile terminal comprises:
 based on a value of the characteristic of the mobile terminal, selecting one of the multiple groups of preambles, and
 selecting the preamble from the preambles of the selected group of preambles.

16. The method of claim 15, further comprising, if the decision is not to designate the characteristic of the mobile terminal, then the mobile terminal randomly selecting a preamble to be transmitted in the RACH instance of the second group of RACH instances.

17. The method of claim 15, further comprising, if the decision is not to designate the characteristic of the mobile terminal, then the mobile terminal selecting a preamble to be transmitted in the RACH instance of the second group of RACH instances based at least in part on a second characteristic of the mobile terminal.

* * * * *